Patented Apr. 24, 1928.

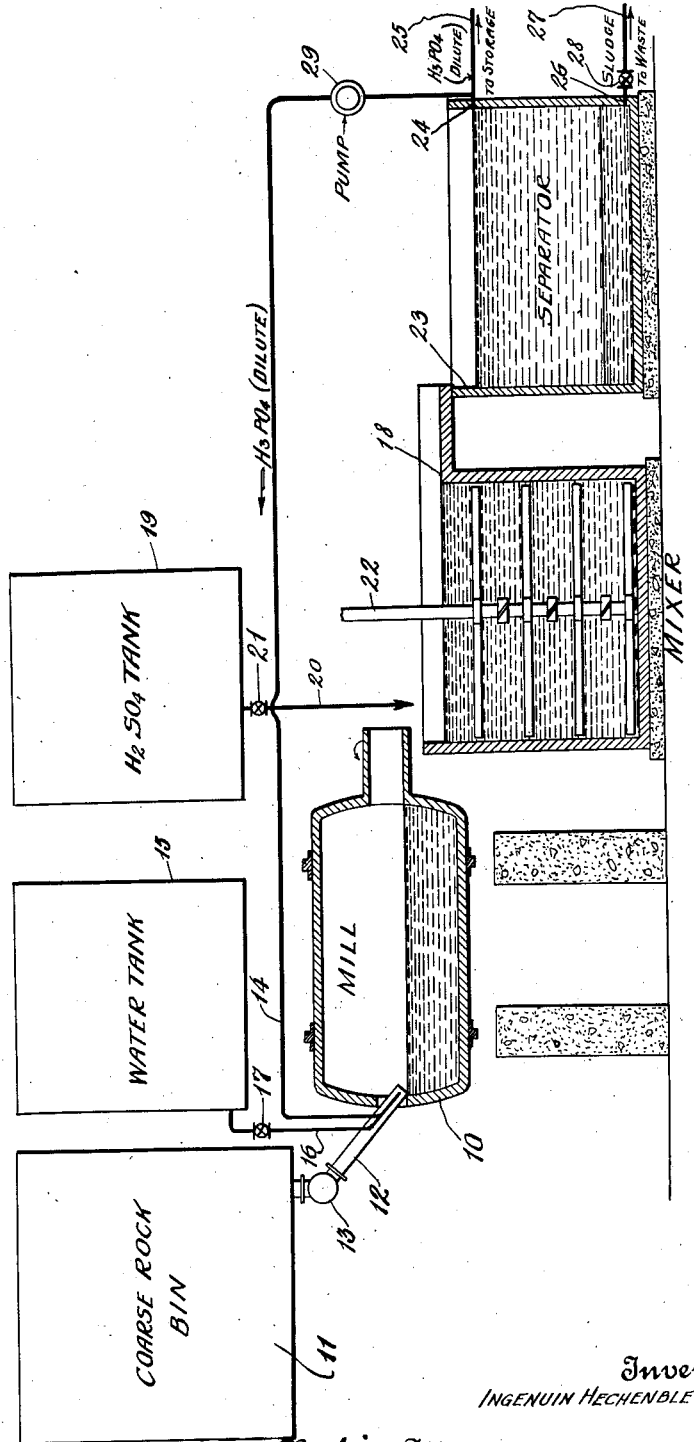

1,667,549

UNITED STATES PATENT OFFICE.

INGENUIN HECHENBLEIKNER, OF CHARLOTTE, NORTH CAROLINA, ASSIGNOR TO CHEMICAL CONSTRUCTION COMPANY, OF NEW YORK, N. Y., A CORPORATION OF NORTH CAROLINA.

ART OF PHOSPHORIC ACID MANUFACTURE.

Application filed April 1, 1924. Serial No. 703,460.

This invention relates to the art of phosphoric acid manufacture, and relates more particularly to an improved method of obtaining phosphoric acid by the wet grinding of a calcium phosphate containing rock in the presence of phosphoric acid, added at the time of grinding or produced by the addition of another acid, such as sulphuric.

In the manufacture of phosphoric acid by reacting phosphate rock with sulphuric acid in accordance with prior methods, the calcium phosphate containing rock is first ground in a mill in a dry state to produce an impalpable powder; and a charge of the ground phosphate rock is mixed with sulphuric acid in a mixer or agitator, the phosphate rock particles reacting with the sulphuric acid to produce phosphoric acid and calcium sulphate. The products of reaction are then introduced into a separator, where the phosphoric acid is separated from the calcium sulphate residue.

A prime desideratum of our present invention relates to improvements in this method of phosphoric acid manufacture in which the reactions are carried on with increased speed and efficiency, and in which the process as a whole is practiced with greater speed, economy and convenience. The grinding of the phosphate rock in a dry state as heretofore practiced presents operating difficulties, among which are the slowness of the grinding step, and the necessity of handling in separate steps the rock and the ground material. The reacting of the powdered phosphate rock with sulphuric acid also presents operative difficulties among which is the necessity for effecting a very intimate mechanical intermixture between the powdered rock and the liquid reagent to produce the desired reaction. By the present invention, it is contemplated to obviate these disadvantages, the grinding and mixing operations of the process being modified to effect a more intimate reaction of the phosphate rock and a more expeditious carrying out of the grinding and mixing steps of the method.

We have discovered that the phosphate rock instead of being separately ground in a dried state and then mixed for reaction with sulphuric acid may be subjected to the treatment of phosphoric acid, the grinding of the rock in the presence of the acid eliminating the prior necessity of separately handling the powdered rock and the objections incident to dry grinding, and effecting a more intimate reaction between the acid and the rock than has been found possible in the mixing step of the method as heretofore practiced. One of the principal objects of the present invention centers about the production of soluble phosphates in a continuous process, by the wet grinding of the rock in the usual mill, in the presence of dilute phosphoric acid supplied continuously or by additions in quantity sufficient to provide an overflow of the dilute acid and the fluent product of the grinding. The overflow is reacted with sulphuric acid, and a portion of the dilute phosphoric acid diverted to the grinding operation.

We have discovered by operating in this manner that the process may be considerably hastened, and the reaction speeded, with the use of simplified apparatus, since by wet grinding with the sulphuric acid phosphoric acid is produced, thus dispensing with the steps of handling the ground rock and mixing with sulphuric acid in a mixer to obtain the phosphoric acid. A further object of the invention therefor comprehends the use of sulphuric acid in the initial grinding operation.

To the accomplishment of the foregoing and such other objects as may hereinafter appear, our invention consists in the process, the steps of the process and their relation one to the other, as hereinafter particularly described and sought to be defined in the claims; reference being had to the accompanying drawing which shows a preferred form of our invention, and in which:

The figure is a view showing in diagrammatic form a phosphoric acid plant employed in the practice of the method.

In carrying out the operation, coarse phosphate rock is ground in the presence of phosphoric acid, and to facilitate and speed up the process sulphuric acid may be added to the initial batch to produce the phosphoric acid.

In the subsequent operations of the process, the coarse phosphate rock is ground in the presence of a dilute phosphoric acid, which preferably is obtained from one of the separators, the grinding of the rock in phosphoric acid producing a primary reaction in which mono calcium phosphate is obtained, in accordance with the following formula:

(a) $Ca_3(PO_4)_2 + H_3PO_4 = 3CaH(PO_4)$.

This mono calcium phosphate is water-soluble and is delivered in liquid state into a mixing tank into which sulphuric acid is introduced, the mono calcium phosphate reacting with the sulphuric acid producing a secondary reaction in which phosphoric acid and calcium sulphate are obtained in accordance with the following formula:

(b) $CaH(PO_4) + H_2SO_4 = H_3PO_4$ and $CaSO_4$.

The products of this secondary reaction are then fed into a separator where the phosphoric acid is separated from the residue or slurry calcium sulphate. It will be noted that by subdividing the treatment of the rock into the primary and secondary reaction stages, we are enabled to effect a moist grinding of the rock with its attendant advantages, and a more intimate reaction between the rock and the acid than can be obtained in a mechanical mixer. A further advantage of this process is the production of the mono calcium phosphate, which being water-soluble, is introduced into the mixer in a liquid state, this liquid reacting with the sulphuric acid with greater facility and speed than is obtaned in prior methods by the reaction of the impalpable powder with the sulphuric acid. It will also be observed that since the mono calcium phosphate is water-soluble, the precipitation of sulphuric acid products such as calcium sulphate in the mill is prevented. It has also been found that the practice of this method permits the obtaining of a more concentrated product after separation, minimizing subsequent concentration steps, and that a cleaner washing is obtained in the separating steps of the method.

Referring now to the drawing, in which we show the apparatus employed in the practice of the method, we provide the usual mill 10, into which is fed coarse rock from a coarse rock bin or compartment 11 through a duct 12, the feed through which is regulated by means of a regulator 13. Into this mill in the beginning of the process is fed sulphuric acid, and afterwards is fed dilute phosphoric acid taken from one of the separators, as will be shown more hereinafter, and conducted through the pipe 14 having entry into the mill, the phosphoric acid being if desired diluted by mixing the same with water obtained from a water tank 15 and fed into the mill through a pipe 16 controlled by a valve 17.

The mono calcium phosphate obtained in the mill overflows and feeds into a mixing tank 18 into which sulphuric acid is introduced from a sulphuric acid tank 19 through a pipe 20, the flow of which is controlled by a valve 21, the said mixer being provided with the usual agitating or mixing device 22. The secondary reaction between the liquid mono calcium phosphate and the sulphuric acid here takes place, the products of reaction consisting of the calcium sulphate and the phosphoric acid overflowing and feeding into the separating tank 23. It will be understood that although one mixer is shown in the drawings, that in practice a plurality of these mixers arranged in cascade or series may be and are employed.

The separating tank 23 may be of the gravity type, in which the phosphoric acid is separated from the sludge or waste, the former having exit at 24 to a pipe 25 connected to a storage reservoir, and the latter having exit at 26 into a waste pipe 27 which may be controlled by a valve 28. Although one separator has been shown in the drawings, it will be understood that a plurality of separators also arranged in cascade or series may be and are employed in practice.

The dilute phosphoric acid which is employed for reaction with the phosphate rock in the mill is taken from one of the separators, this being shown diagrammatically in the drawing, said phosphoric acid being pumped from the pipe 25 by means of the pump 29 into the pipe 14 connected to the grinding mill.

The practice of the method, use of the apparatus, and the advantages thereof, will in the main be fully apparent from the above detailed description thereof taken in connection with the operation. It will be further apparent that many changes may be made in the apparatus disclosed and in the steps of the method without departing from the spirit of the invention defined in the following claims. For example, the separation between the liquid and the slurry or sludge in the last step of the method may be effected in any manner well known in the art, as for example by the employment of filters in lieu of mechanical separators. It will thus be apparent that numerous rearrangements and changes may be made without modifying the principle of the present invention.

I claim:

1. The herein described continuous method of producing phosphoric acid from phosphate rock, which consists in grinding the rock in phosphoric acid with additions of dilute phosphoric acid sufficient to provide a substantially continuous overflow of acid and the fluent product of the grinding, and reacting the overflow with sulphuric acid.

2. The herein described continuous method of producing phosphoric acid from phosphate rock, which consists in grinding the rock in dilute phosphoric acid with additions of dilute phosphoric acid sufficient to provide a substantially continuous overflow of acid and the fluent product of the grinding, treating the overflow with sulphuric acid to precipitate calcium sulphate, separating the liquid from the sludge, and diverting a portion of the liquid to the rock being ground to provide a selected strength of acid for the grinding.

Signed at New York city in the county of New York and State of New York this 29th day of March A. D. 1924.

INGENUIN HECHENBLEIKNER.